United States Patent [19]

White, III

[11] Patent Number: 4,571,831
[45] Date of Patent: Feb. 25, 1986

[54] CUTTING HEAD FOR FILAMENT TRIMMER

[75] Inventor: Donald M. White, III, Chanhassen, Minn.

[73] Assignee: The Toro Company, Minneapolis, Minn.

[21] Appl. No.: 636,429

[22] Filed: Jul. 31, 1984

[51] Int. Cl.$^4$ .............................................. B26B 7/00
[52] U.S. Cl. ...................................... 30/276; 30/347; 56/12.7
[58] Field of Search ................... 30/276, 347; 56/12.7, 56/295

[56] References Cited

U.S. PATENT DOCUMENTS

| | | | |
|---|---|---|---|
| 4,054,992 | 10/1977 | Ballas et al. | 56/12.7 X |
| 4,065,913 | 1/1975 | Fisher et al. | 56/12.7 X |
| 4,203,212 | 5/1980 | Proulx | 30/276 |

Primary Examiner—Douglas D. Watts
Attorney, Agent, or Firm—Joseph P. Martin

[57] ABSTRACT

A cutting head (20) for a filament trimmer utilizing a fixed length of filament is shaped like an inverted bowl with a flange (2). A filament retainer cup (60) is attached to the concavity of head (20) and has two V-shaped slits (64) diametrically opposed. Apertures (6) in the sides of head (20) are aligned with slits (64). Bosses (36) extend outwardly from sides of bowl about half the width of flange (2) and terminate in planar faces (6). Faces (6) are inclined inwardly and upwardly and contain slots (26). Eyelets (24) are press fit into slots (26). Filament (4) is installed through eyelets and is pressed into slits (64) so free ends (5) are the same length on both sides of the head. Free ends (5) define a cutting plane when head (20) is rotating. Slits (64) impose a slight crimp in filament (4) and prevent filament (4) from moving axially when the device is in operation. Abutments (74) prevent vibrations caused by filament (4) contacting weeds and the like from migrating inwardly to retention point in slit (64), thereby preventing an excessive build-up of heat which could damage filament. Flange (2) provides a buffer to prevent filament ends (5) from being pinched or abraded between head (20) and foundations and the like. The V-shape of slits (64) allows use of various diameter filaments.

5 Claims, 10 Drawing Figures

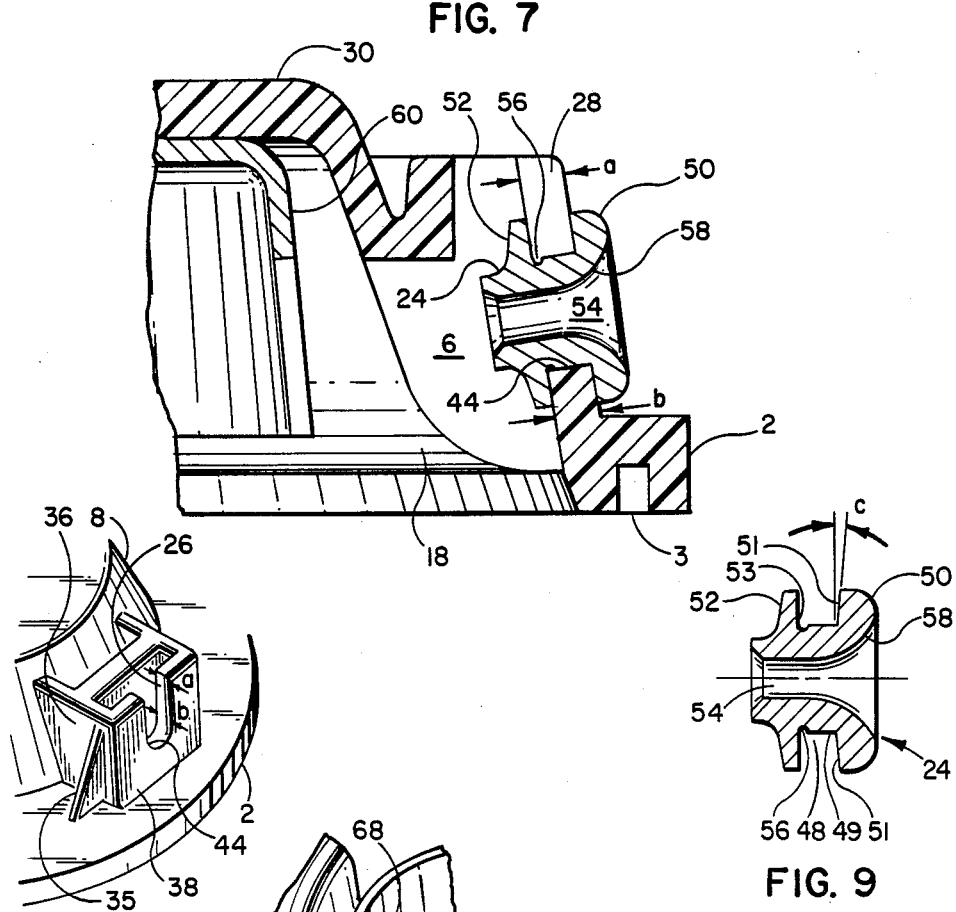
FIG. 7
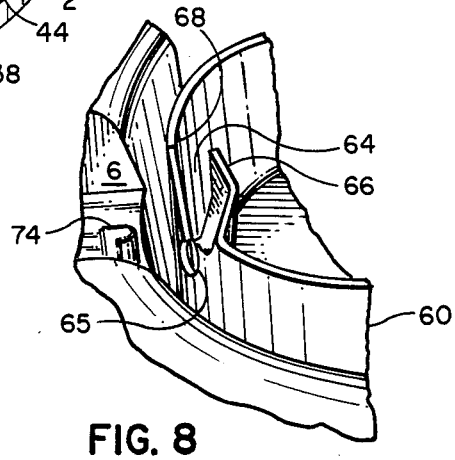
FIG. 9
FIG. 10
FIG. 8

4,571,831

CUTTING HEAD FOR FILAMENT TRIMMER

TECHNICAL FIELD

This invention relates to a cutting head for a filament trimmer with a fixed length cutting element. More specifically, it relates to a head incorporating line retaining means as well as means for preventing vibrations created in the line from traveling to the line retaining means, thereby forestalling an excessive build-up of heat and wear at the point of line retention and subsequent degradation of the filament.

BACKGROUND OF THE INVENTION

Filament cutting devices were recently introduced and have rapidly become well known. A power source rotates a head or housing at high speed. One or more flexible, non-metallic filaments extend from the head or housing a short distance, the speed of rotation causing the filament to stiffen and thus constituting a cutting element.

Heavy duty trimmers for commercial use are typically equipped with a gasoline engine as a power source and may have a relatively heavy filament, often as a fixed length line which is replaceable as a unit. The fixed length filament may be on the order of 0.105 or 0.130 inch diameter line, whereas a trimmer designed essentially for use by a homeowner typically utilizes a filament of 0.080 inch diameter, or less.

The filament naturally wears and abrades as it encounters vegetation, fences, foundations, etc., and must be replaced periodically. As might be expected, the smaller filament wears more rapidly, and thus the trimmer utilizing this filament is often equipped with a reserve supply, which may be coiled in the head or housing, and is available as needed. The trimmer may have a manual system for unreeling more filament, or may have an escapement device to meter out filament while the device is in operation.

The larger diameter filament would normally be utilized on commercial trimmers, both because it lasts longer, and also because it can cut heavier vegetation which normally would not be encountered around a residence. Because of its relative stiffness, the larger diameter filament does not lend itself readily to being coiled on a small diameter spool as is necessary on a consumer-type trimmer, so a heavy filament of a fixed length is often used in the commercial units.

One such device is disclosed in U.S. Pat. No. 4,190,954, assigned to The Toro Company, assignee of the present invention. The trimmer head of this device is metallic, which requires balancing, thus adding to the cost. The filament is strung across the head in a serpentine manner and is retained by being wedged into slots in adjacent pairs of ear members on the bottom of the head. Ramps are required to prevent the filament from being abraded against the ground. The filament exits at the periphery of the head of this device, so the filament is often pinched between the head and an obstruction such as a wall or foundation or the like.

Another fixed length filament trimmer is disclosed in U.S. Pat. No. 4,054,992 to Ballas et al. FIG. 4 illustrates a grooved head where the grooves are slightly smaller than the filament, but are enlarged below the surface so the filament fits "in a relatively slideable manner" as revealed in Column 9, lines 31–35. The present invention retains the filament so it cannot slide or move axially.

It has been found that vibration develops in the filament from contact with vegetation and other obstructions, and unless controlled, results in an excess build-up of heat where the filament contacts the head. This heat can increase to the point where the filament literally melts and fuses itself to the head, or breaks off.

The present invention provides a balanced head of relatively small diameter which provides a practical means for retaining a fixed length filament of various diameters which is easily replaceable, and for minimizing vibration in the filament.

SUMMARY OF THE INVENTION

The present invention is directed to an apparatus for cutting vegetation in which the cutting element is a fixed length of filament mounted in a cutting head which is rotated rapidly by a power source having a drive shaft to which the head is attached. The power source may be an electric motor or a gasoline engine. The filament extends across and out both sides of the cutting head, whereby the free ends of the filament define a cutting plane. The filament used in this invention is typically heavier than that commonly used in trimmers used by homeowners around their homes.

In the preferred embodiment, a lightweight plastic head is molded in the shape of an inverted bowl. Two apertures are provided 180° apart in the sides. A metallic cup is concentrically attached to the head, and has two slits vertically cut part way down the sides of the cup. A portion of the side adjacent each slit is bent inwardly to create a V-shaped passageway for the filament in a manner that creates a sharp bend in the filament and prevents axial movement of the filament when subjected to centrifugal force when the trimmer is operating. The relatively sharp edges of the slit, in effect, tend to bite into the filament and prevent its movement. The cup also acts as a heavy washer between the head and the means securing the head to the drive shaft, which may be either a nut or a cap screw, depending on the configuration of the drive shaft.

The sides of the head are molded with a downwardly directed slot adjacent each aperture. The slots have parallel sides and terminate in a rounded lower end. The plane of each slot is angled inwardly at an oblique angle in relation to the axis of rotation. An eyelet with a central tapered annular groove is press fit into each slot until the eyelet is seated at the rounded bottom of the slot. The annular groove tapers inwardly from its opening to its base. The width of the groove at its base is less than the thickness of the wall adjacent the slot, so the eyelet must be forced down into the slot, providing an interference fit. The eyelet is then crimped in position. The interference fit, the crimping, and the inwardly angled attitude of the slots cooperate to retain the eyelets in their position when subjected to the centrifugal force generated when the device is operating. This method of retaining the eyelet allows the use of an eyelet with a large flange on the outside. The large flange makes possible a large radius bell-mouth which acts as a strain relief for the filament as it bends back due to contact with vegetation or other obstructions. This large outer flange is not possible with eyelets mounted in a hole, inserted from the inside, and then crimped in place. This method of eyelet retention also obviates the use of additional parts, such as inserts placed in the slots, or covers or the like, thus contributing to a lower total cost of the cutting head.

The preferred embodiment illustrated herein contemplates the eyelets and slanted mounting slots being located inwardly from the periphery of a relatively heavy annular flange, the flange to be the lowest part of the apparatus while operating. This flange protects the filament from being pinched between the head itself and obstructions such as walls, foundations and the like, and becoming abraded or actually cut off.

The various other features and advantages of the present invention will be specifically pointed out in the claims attached hereto. References to the following drawings and Detailed Description will provide a greater understanding and appreciation of this invention.

BRIEF DESCRIPTION OF THE DRAWINGS

This invention will be described more fully hereafter in the Detailed Description, when taken in conjunction with the following drawings, in which like reference numerals refer to like elements throughout.

FIG. 7 is a fragmentary cross-sectional view of the head of FIG. 3, taken along the line 7—7;

FIG. 8 is a fragmentary perspective view of the cup of FIG. 6, particularly showing the V-shape of the slits;

FIG. 9 is a cross-sectional view of the eyelet of FIG. 7, illustrating the taper of one side of the groove; and FIG. 10 is an inverted fragmentary perspective view of the slot of FIG. 7, showing the taper of the material of the sides of the slot.

DETAILED DESCRIPTION OF THE PREFERRED EMBODIMENT

Figure 1:
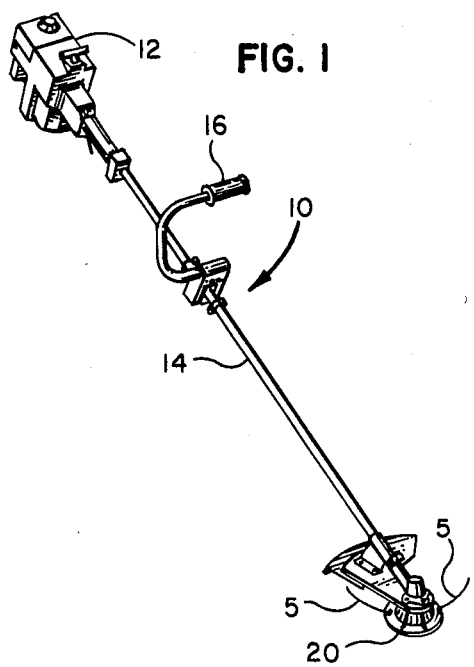
FIG. 1 is a perspective view of a filament trimmer embodying the present invention.

In FIG. 1, a trimmer of the type utilizing a rotating flexible non-metallic filament is generally designated by the numeral 10. Trimmer 10 utilizes a power source which is normally an internal combustion engine 12. The power source also may be an electric motor. Engine 12 is mounted at or near an end of a shaft 14 and a cutting head 20 shaped like an inverted bowl is mounted at the opposite end of shaft 14. Shaft 14 is of a length suitable for an operator to carry trimmer 10 comfortably while performing trimming operations on vegetation. A handle 16 is adjustably mounted on shaft 14 and may be positioned for optimum balance and comfort for operators of differing statures.

A filament 4 of a fixed length is retained in head 20 by means to be described later. Diametrically opposed apertures 6 in sides 8 communicate with the concavity of head 20 and allow filament 4 to be strung across head 20 and out apertures 6 on both sides of the head 20. The free lengths 5 of filament 4 pass through bell-mouthed eyelets 24 mounted in retaining slots 26 adjacent apertures 6. As power source 12 rotates head 20 by means of the shaft (not shown), the free ends 5 of filament 4 stiffen because of centrifugal force and form a cutting plane parallel to the flange 2 on cutting head 20.

The filament 4 of the present invention has a diameter typically in the range of 0.100 to 0.130 inches.

Figure 2:
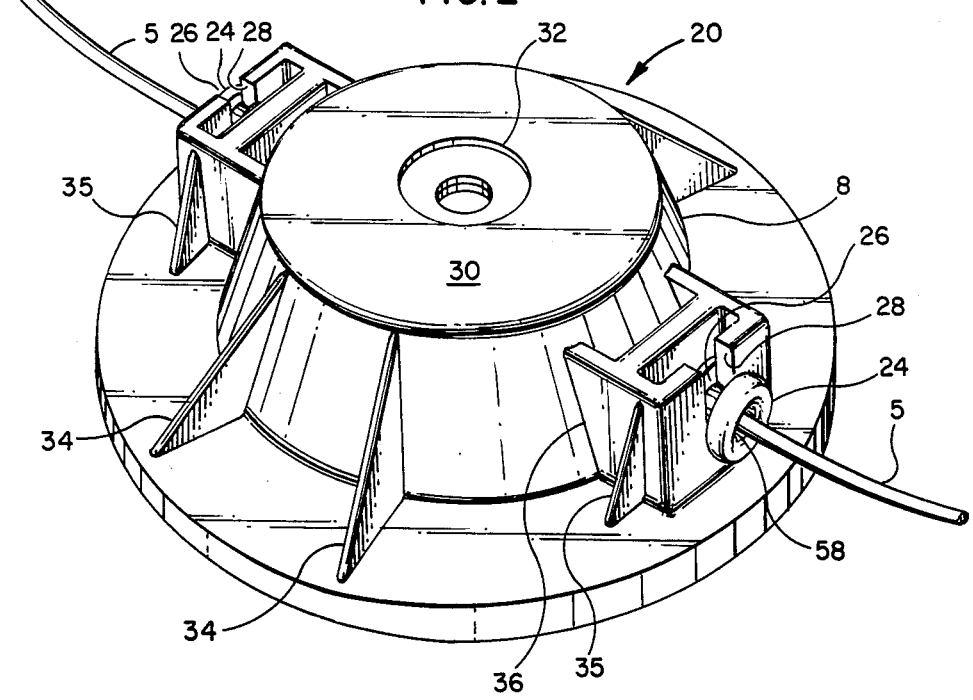
FIG. 2 is a perspective view on a larger scale, showing the cutting head of the trimmer of FIG. 1.
Figure 3:
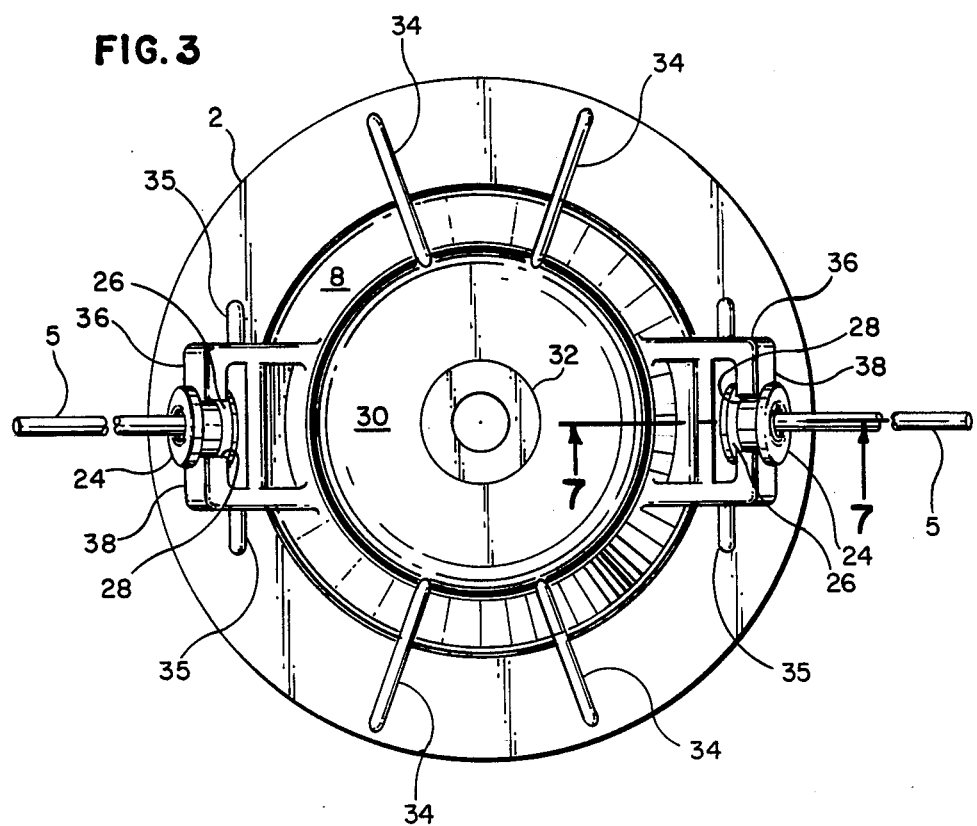
FIG. 3 is a top plan view of the head of FIG. 2.
Figure 4:
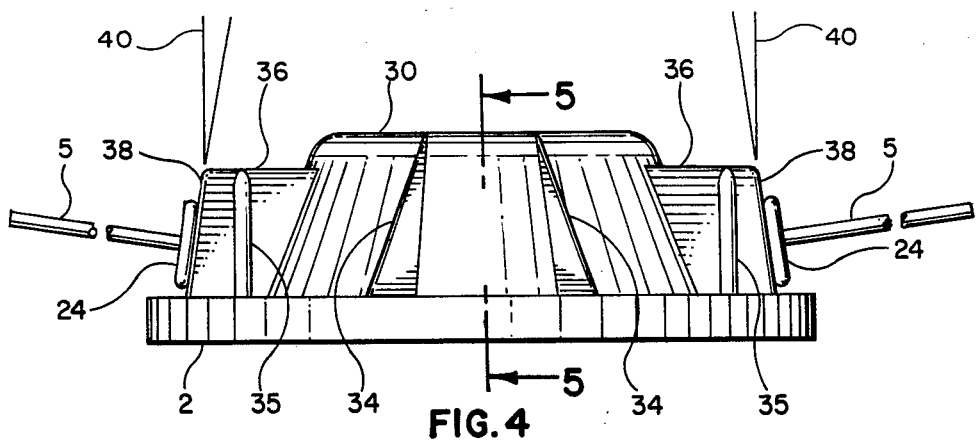
FIG. 4 is a an elevational view of the head of FIG. 2.
Figure 5:
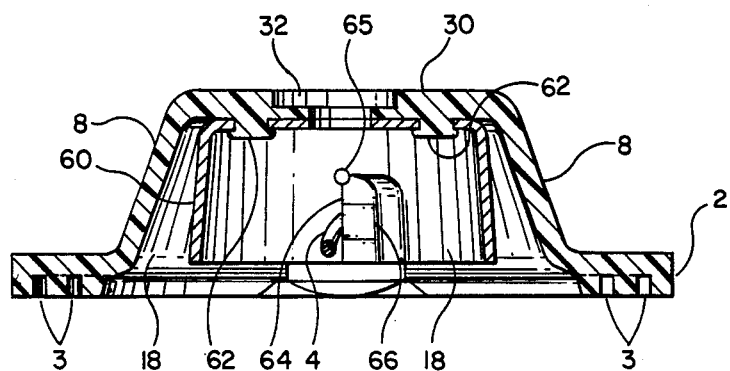
FIG. 5 is a cross-sectional view of the head of FIG. 4 taken along the lines 5—5 of FIG. 4.

Referring to FIG. 2, cutting head 20 is formed from any suitable material, preferably a lightweight plastic that can be molded. One of the principal objects of this invention is to provide a head that does not require balancing, either when it is new, or after it has been subjected to wear. A preferred material is a high impact nylon.

Head 20 comprises a top wall 30, sloping sides 8, an annular flange 2, and a countersunk opening 32 for mounting head 20 to the shaft (not shown), triangular gussets 34 molded between sides 8 and flange 2 to add strength and rigidity to head 20 without adding substantial weight. Grooves 3 are molded into bottom side of flange 2 to reduce weight and also to reduce the time head 20 must be in the mold, thereby contributing to a lower price. Bosses 36 are located diametrically opposite each other aligned with apertures 6 and extend from sides 8 partway out flange 2. Gussets 35 are molded between the sides of each boss 36 and flange 2 for structural support. The outer face 38 of boss 36 is planar and at an oblique angle 40 to the axis of rotation. Planar face 38 of boss 36 is located approximately half way between the junction of flange 2 and side 8 and the periphery of flange 2, and contains slots 26 which will be described later. An aperture 6 through side 8 communicates each slot 26 with aperture 6 and thence with concave interior 18 of head 20. An eyelet 24 which will be described more fully later is press fitted in each slot 26.

Referring now to FIG. 10, each slot 26 is formed with parallel sides 28 and terminates in a rounded seat 44. The depth of slot 26 is such that a straight-line passageway is formed through slot 26 and aperture 6 to the interior of the head. The portion of planar face 38 forming sides 28 of slot 26 is slightly tapered in thickness from the top of slot 26 at "a" to just above the beginning of the radius of rounded seat 44 at "b". The thickness of the the plastic at the top of slot 26 is approximately ten thousandths inch less than at the bottom. This is best shown in FIG. 10. The purpose of this taper will be described later. The plane of the face 38 in which slot 26 is formed is angled inwardly toward the axis of rotation at an angle 40 of approximately 7°. 7° is the optimum angle to assist in retaining the eyelet and yet provide that filament 4 exits eyelet 24 at an angle that is not too great.

An eyelet 24 best illustrated in FIG. 9 is preferably formed of aluminum and has a central annular groove 48 formed by annular flanges 50 and 52. The diameter of flanges 50 and 52 is substantially greater than the width of slot 26. Flange 50 includes a bell-mouth 58 leading into a central bore 54. Bell-mouth 58 provides a rounded support surface for filament 4 as it is deflected as a result of contact with vegetation and other obstructions. One side 53 of annular groove 48 is perpendicular to the axis of bore 54. The other side 51 is angled outwardly from the bottom of groove 48 at an angle of approximately 4° from perpendicular as at "c" in FIG. 9, so groove 48 is slightly inclined inwardly from top to bottom on one side. An annular groove 56 is formed adjacent perpendicular side 53 for a purpose to be explained later. The width of groove 48 at its base 49 is slightly less than the thickness of side of slot 26 at "b" just above rounded seat 44 of slot 26. The diameter of groove 48 is slightly less than the diameter 44 at the bottom of slot 26, so eyelet 24 fits snugly in seat 44.

Since the bottom of groove 48 is narrower than the side of the slot at "b", eyelet 24 must be pressed into slot 26. A force of approximately 30 pounds is required. Bell-mouth 58 of eyelet 24 faces the outside of head 20. Since groove 48 is tapered and sides 28 of slot 26 are tapered, these tapers facilitate starting eyelet 24 into slot 26. As eyelet 24 is being forced down slot 26, the plastic material of head 20 is displaced until eyelet 24 is fully seated in the rounded seat 44 of slot 26. Flange 52 is then crimped in place by any convenient means. Groove 56 facilitates the crimping process and allows flange 52 to be deformed without cracking. The crimping, the interference, and the inwardly angled attitude of face 38 with slot 26, and the filament 4 itself cooperate to prevent eyelet 24 from being thrown out of head 20 under the effect of centrifugal force or the cutter head contacting an obstruction.

In the preferred embodiment, two posts 62 are molded into head 20 and extend through two holes 63 in cup 60 and posts 62 are then staked to secure cup 60. Cup 60 is attached to the concavity of the head. The sides of cup 60 have two diametrically opposed slits 64 extending approximately half way down the sides. A hole 65 is punched at the inner end of each slit 64 to prevent further elongation of slit 64. A portion of the side adjacent each slit 64 is bent inwardly as at 66 in FIG. 6. One bend is in each hemisphere of cup 60 and the bent edge 66 is in the leading side of cup 60 in relation to the direction of rotation of head 20 so filament 4 is supported against the outer unbent side 68. Bent portion 66 together with unbent side 68 creates a V-shaped slit 64 for filament 4. As can best be seen in FIG. 6, filament 4 is installed in head 20 and out eyelets 24. The filament 4 is then pressed down into slits 64 so that free ends 5 of filament 4 are extending out both sides. In the preferred embodiment, the center of filament 4 is marked with a black dot 70 so it can be centered in head 20 for optimum balance. Slits 64 impose an offset 72 in filament 4 which together with the V-shape of slits 64 and relatively sharp edges of slits 64, retains filament in head 20, and prevents axial movement of filament. The V-shape of slits 64 allows varying diameters of filament 4 to be utilized, yet each size of filament 4 is securely retained. A larger diameter filament will be retained higher in the V slit, and smaller diameter filament naturally will be pressed deeper into the V slit 64. The apex of V-shaped slit 64 is slightly higher than the plane of eyelets 24. As the head rotates, filament 4 under the effect of centrifugal force, attempts to straighten out into the plane of eyelets 24, thus pressing further into the V of slit 64 and is thereby self-tightening.

Figure 6:
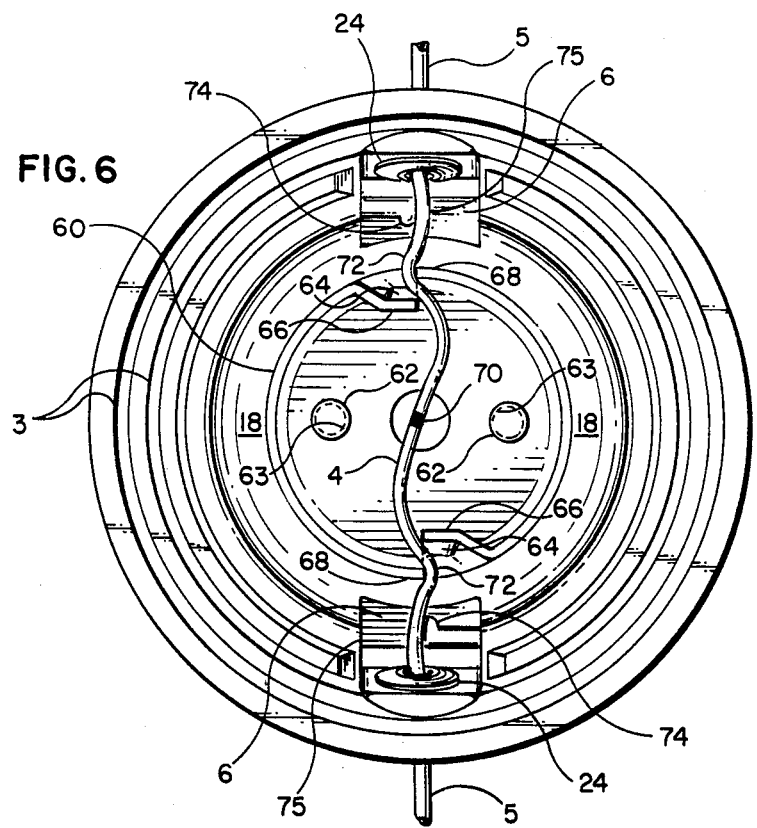
FIG. 6 is a bottom plan view of the head of FIG. 5, particularly showing the path of the filament and the abutments.

It has been found that as the head is rotating and the free ends 5 of filament 4 are contacting vegetation and other obstructions, a vibration is created that migrates inwardly to the point of filament retention. This vibration often generates enough heat that the filament literally melts and breaks off. To combat this, the present invention provides an upstanding abutment 74 between the filament retaining slits 64 and eyelets 24. The abutment 74 is designed of a length that it protrudes just far enough into the path of filament 4 so that it imposes a slight bend 72 in filament 4 and prevents vibrations from proceeding inwardly to the point where the filament is retained in the slits 64. This is best shown in FIG. 6. Abutment 74 is located at approximately the mid-point of the span of filament 4 between V-slit 64 and eyelet 24.

The relationship of the length of this span and the diameter of the filament used is essential to this invention. It has been found that a span of approximately ¾ inch between slit 64 and eyelet 24 is optimum when using filament of 0.105 inch diameter. A slightly larger span may be utilized when using filament of 0.130 inch diameter.

A preferred embodiment of the present invention is illustrated and described herein. However, it should be understood by those skilled in the art that various modifications and adaptations as well as alternative embodiments may be contemplated. Therefore, the scope of the invention should be limited solely by the appended claims.

I claim:

1. A vegetation cutting device having a power source for rotatably driving a fixed length filament cutting element, comprising:
   (a) an inverted bowl-shaped cutting head including a top wall, sloping sides, and an annular flange extending beyond said sides;
   (b) two diametrically opposed apertures in said sides;
   (c) an integral boss adjacent and external to said aperture terminating in a planar face inclined inwardly and upwardly at a slight angle to the axis of rotation and including a vertically disposed slot, said slot and said aperture providing a passageway to the interior of said head;
   (d) an eyelet including two annular flanges forming a central groove, the diameter of said flanges substantially greater than the width of said slot, and the width of said groove slightly less than the thickness of the sides of the boss forming said slot, said eyelet pressed into said groove with an interference fit;
   (e) filament retaining means attached to the interior of said head, said retaining means including an inverted cup with upstanding V-shaped slits in radial alignment wth said apertures and said eyelets, the apex of said V slit in a plane higher than the plane of said eyelets;
   (f) a fixed length filament extending diametrically across said head, a free end extending equally a short distance from both eyelets, said filament retained in said V slit of said retaining means whereby said filament tends to straighten out when subject to centrifugal force, thereby moving deeper into said V slit, thus self-tightening; and
   (g) abutment means for preventing vibration generated by said free ends migrating inwardly to said retaining means, said abutments extending from said sides into said apertures into the path of said filament an amount sufficient to create a slight bend in said filament, thus imposing a tension on said filament to dampen vibration.

2. A vegetation cutting device having means for rotatably driving a fixed length filament with free ends which form a cutting element and including a vertically disposed drive shaft defining an axis of rotation, the improvement comprising:
   (a) a bowl-shaped head attached to said shaft, the concavity of said head facing away from said driving means, said head including a top wall, outwardly sloping sides, and an annular flange defining the open end of said head;
   (b) two diametrically opposed apertures in said sides adjacent said flange;

(c) an integral boss adjacent and external to each aperture, said boss terminating in a planar surface inclined inwardly and upwardly at a slight angle to the axis of rotation and including a vertically disposed slot having an open top and a rounded bottom, said slots and said apertures aligned to provide passageways to the interior of said head;

(d) an eyelet pressed into each slot, each eyelet having a central groove defined by an inner and outer flange whose diameters are substantially greater than the width of said slot, the outer flange being bell mouthed in cross-section, said bell mouth providing support for the free ends when said free ends bend back due to contact with an obstruction;

(e) filament retaining means comprising an inverted cup attached concentrically within the concavity of said head, the sides of said cup containing diametrically opposed vertical slits aligned with said slots and apertures, a portion of said cup adjacent said slit bent inwardly thereby making the slit V-shaped when viewed tangentially, whereby said slits are disposed to impose a crimp in said filament to prevent axial movement of said filament during operation, and whereby the V-shaped configuration of the slits allows the use of a variety of filaments with different diameters for different applications, whereby a filament with a small diameter will ride deeper in the V slit than a filament with a relatively great diameter; and (f) vibration damping means between said slit and said eyelet for preventing vibration generated by said filament from migrating inwardly to said retaining means.

3. The device of claim 2, wherein said central groove of said eyelet has at least one outwardly tapered side to effectuate a wedging action when said eyelet is pressed into said open-ended slot, which in combination with the inward slope of the surface containing said slot and centrifugal force, cooperates to retain said eyelet in said slot, thereby obviating the additional process of crimping necessary when said eyelet is mounted through a hole, and wereby said open-ended slot allows the use of an eyelet with flanges whose diameter and thickness are not restricted by the necessity of passing through a hole and then crimped or similarly secured.

4. The device of claim 2, wherein said damping means comprises an upstanding abutment partially in the path of said filament, whereby said abutment imposes a slight bend in said filament, thus resulting in said filament applying a pressure against said abutment when said filament attempts to straighten out when subjected to centrifugal force during operation, said pressure holding said filament firmly against said abutment, thus preventing vibration inwardly of said abutment.

5. The device of claim 4, wherein said abutment is integral with said head.

* * * * *